United States Patent
Kim

(10) Patent No.: US 8,486,553 B2
(45) Date of Patent: Jul. 16, 2013

(54) BATTERY PACK

(75) Inventor: Tae-Young Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 436 days.

(21) Appl. No.: 12/801,738

(22) Filed: Jun. 23, 2010

(65) Prior Publication Data

US 2011/0151302 A1 Jun. 23, 2011

(30) Foreign Application Priority Data

Dec. 23, 2009 (KR) .......................... 10-2009-0130021

(51) Int. Cl.
*H01M 10/50* (2006.01)

(52) U.S. Cl.
USPC ........................................ 429/120

(58) Field of Classification Search
USPC .................................. 429/20–347
See application file for complete search history.

(56) References Cited

U.S. PATENT DOCUMENTS

2010/0242516 A1* 9/2010 Seo et al. ...................... 62/259.4
2011/0186365 A1 8/2011 Abadia et al.

FOREIGN PATENT DOCUMENTS

| JP | 10-208781 A | 8/1998 |
| JP | 2003-346922 A | 12/2003 |
| KR | 10-0251412 B1 | 1/2000 |
| KR | 10 2008-0050413 A | 6/2008 |
| KR | 100931272 B1 * | 12/2009 |

OTHER PUBLICATIONS

Korean Office Action in KR 10 2009-0130021, dated Aug. 19, 2011 (Kim).
Korean Notice of Allowance in KR 10-2009-0130021, dated Nov. 21, 2011 (Kim).

* cited by examiner

*Primary Examiner* — Basia Ridley
*Assistant Examiner* — James Lee
(74) *Attorney, Agent, or Firm* — Lee & Morse, P.C.

(57) ABSTRACT

A battery pack including a battery module including at least one battery cell; and a spray unit above the battery module for spraying an insulation fluid onto the battery module.

16 Claims, 6 Drawing Sheets

BATTERY PACK

BACKGROUND

1. Field

Embodiments relate to a battery pack.

2. Description of the Related Art

Rechargeable batteries, i.e., secondary batteries, refer to batteries that may be charged and discharged compared to primary batteries, which cannot be charged. Rechargeable batteries are widely used in high tech electronic devices, e.g., cellular phones, laptop computers, or camcorders, and also as batteries for cars.

Rechargeable batteries include an electrode assembly and an electrolyte solution. The electrode assembly includes a positive electrode plate, a negative electrode plate, and a separator. In a lithium ion rechargeable battery, the electrolyte solution includes lithium ions. The positive electrode plate and the negative electrode plate of the electrode assembly may respectively include an electrode tab exposed to the outside of the electrode assembly.

The electrode assembly may be accommodated inside a case, and an electrode terminal may be exposed out of the case. The electrode tab may extend out of the electrode assembly and be electrically connected to the electrode terminal. The case may be, e.g., cylindrical or quadrilateral.

A battery module may be formed by stacking a plurality of unit battery cells of a rechargeable battery horizontally or vertically. Also, a plurality of battery modules may be stacked horizontally or vertically to form a battery pack.

SUMMARY

Embodiments are directed to a battery pack which represents advances over the related art.

It is a feature of an embodiment to provide a battery pack with improved cooling characteristics by using a liquid having insulation characteristics.

At least one of the above and other features and advantages may be realized by providing a battery pack including a battery module including at least one battery cell; and a spray unit above the battery module for spraying an insulation fluid onto the battery module.

The insulation fluid may be pure water.

The insulation fluid may be sprayed in a liquid state or in a gas state.

The spray unit may include a spray pipe through which the insulation fluid passes; and a spray hole in the spray pipe, the spray hole configured to spray the insulation fluid.

The spray pipe may be curved and disposed on an inner surface of a cover of the battery pack.

The battery pack may further include a cover for accommodating the battery module therein, wherein the spray unit is disposed between the cover and the battery module.

The spray unit may contact an upper inner surface of the cover.

The battery pack may further include a fluid tank configured to accommodate the insulation fluid; and a pump configured to supply the insulation fluid from the fluid tank to the spray unit.

The battery pack may further include a support configured to support the battery module on one surface thereof, wherein the fluid tank and the pump are accommodated in the support.

The battery pack may further include a supply fluid path connecting the pump and an inlet of the spray unit; and a recovery fluid path connecting an outlet of the spray unit and the fluid tank.

The battery pack may further include a cover for accommodating the battery module therein, the spray unit being disposed on an inside of the cover, and the supply fluid path and the recovery fluid path may be supported by an inner surface of the cover.

The supply fluid path and the pump may be detachably coupleable to each other, and the recovery fluid path and the fluid tank may be detachably coupleable to each other.

At least one of the above and other features and advantages may also be realized by providing a battery pack that effects heat dissipation by way of an insulating fluid, the battery pack including a battery module including at least one battery cell; and a spray unit above the battery module for spraying insulation fluid onto the battery module.

The spray unit may include a spray pipe through which the insulation fluid passes; and a spray hole in the spray pipe, the spray hole configured to spray the insulation fluid.

The spray pipe may be curved and disposed on an inner surface of a cover of the battery pack.

The battery pack may further include a cover for accommodating the battery module therein, wherein the spray unit is disposed between the cover and the battery module.

The battery pack may further include a fluid tank configured to accommodate the insulation fluid; and a pump configured to supply the insulation fluid from the fluid tank to the spray unit.

The battery pack may further include a support configured to support the battery module on one surface thereof, wherein the fluid tank and the pump are accommodated in the support.

The battery pack may further include a supply fluid path connecting the pump and an inlet of the spray unit; and a recovery fluid path connecting an outlet of the spray unit and the fluid tank.

The supply fluid path and the pump may be detachably coupleable to each other, and the recovery fluid path and the fluid tank may be detachably coupleable to each other.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
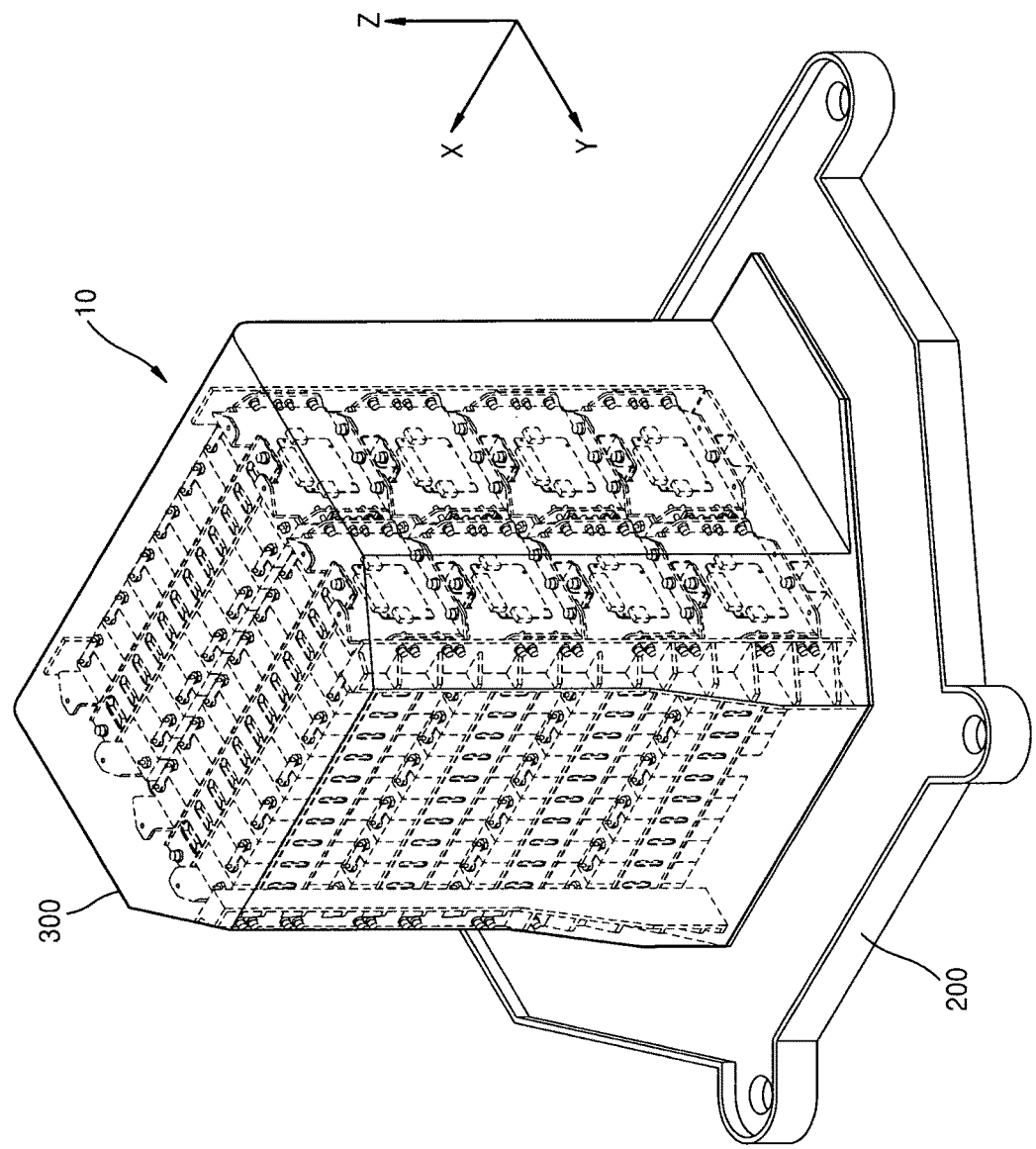
FIG. 1 illustrates a perspective view of an exterior of a battery pack according to an embodiment.

Korean Patent Application No. 10-2009-0130021, filed on Dec. 23, 2009, in the Korean Intellectual Property Office, and entitled: "Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

It will be understood that when an element, such as a layer, a region, or a substrate, is referred to as being "connected to" or "coupled to" another element, it may be directly connected or coupled to the other element or intervening elements may be present. In contrast, when an element is referred to as being "directly connected to" or "directly coupled to" another element or layers, there are no intervening elements or layers present. As used herein, the term "and/or" includes any and all combinations of one or more of the associated listed items.

Figure 2:
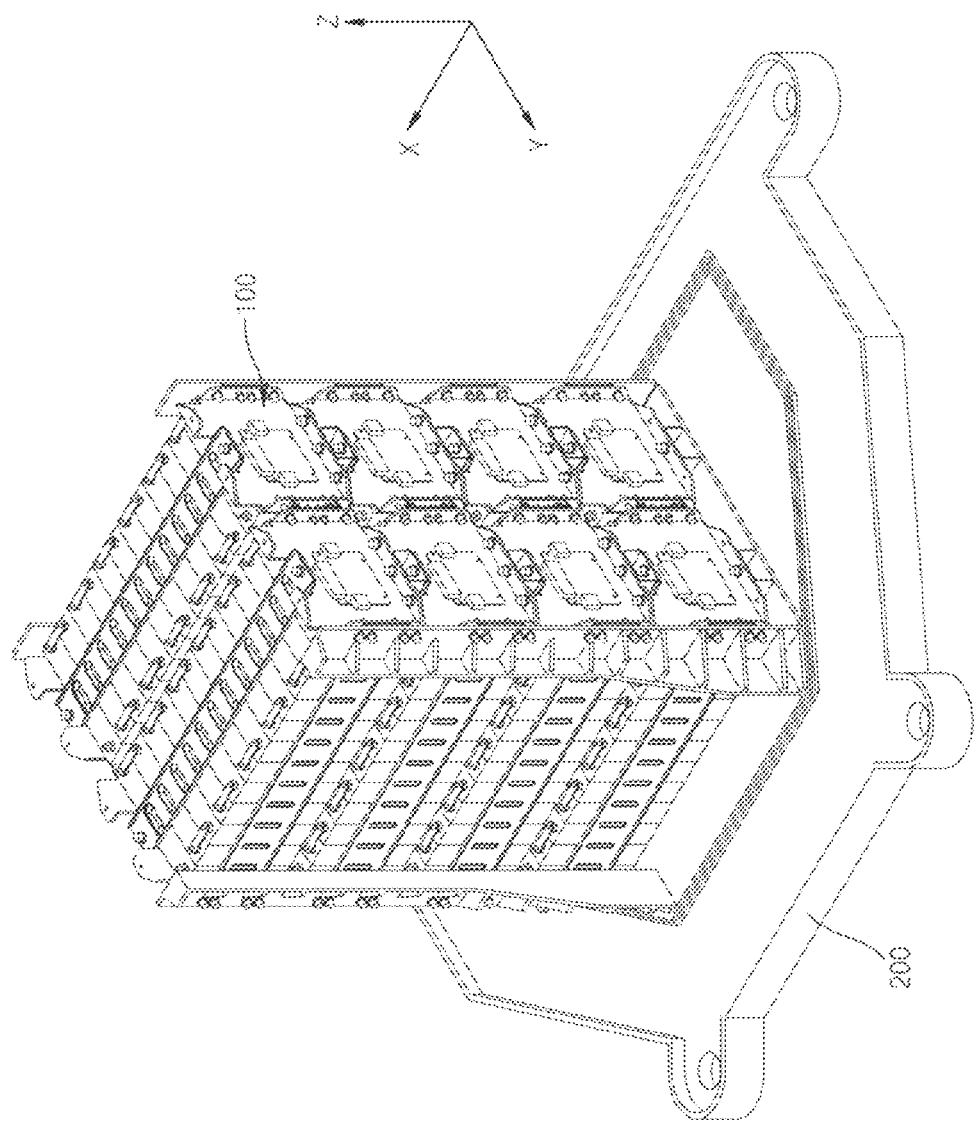
FIG. 2 illustrates a perspective view of the battery pack of FIG. 1 from which a cover thereof has been separated therefrom.
Figure 3:
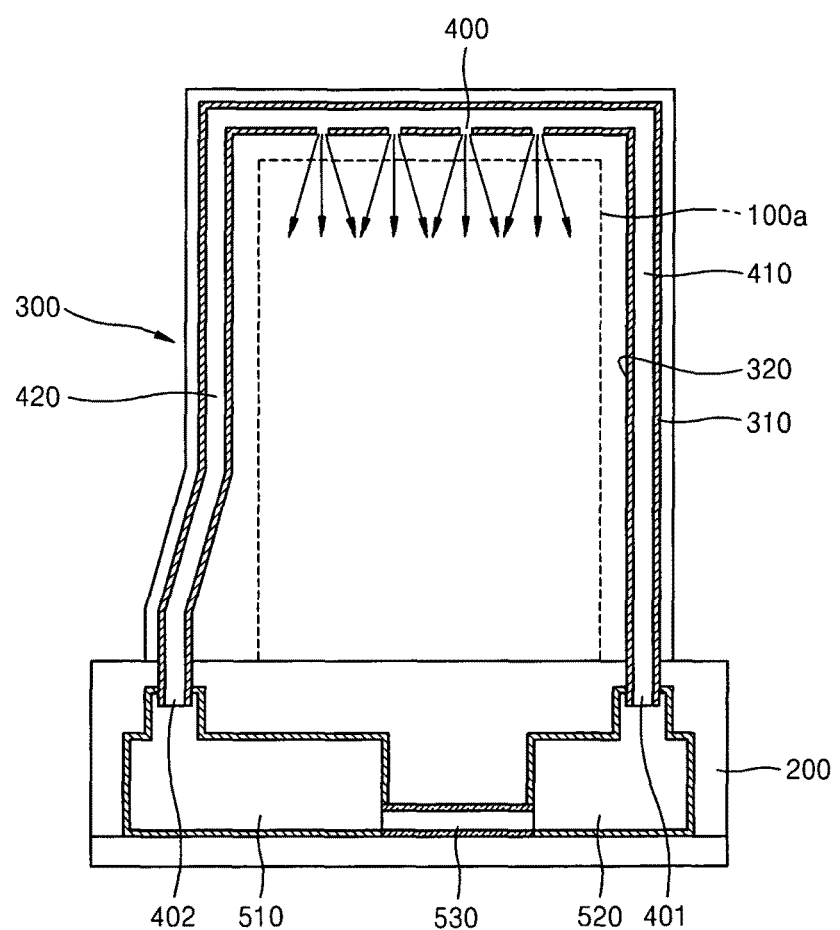
FIG. 3 illustrates a schematic view of the battery pack of FIG. 1 in which a supply fluid path, a spray unit, and a recovery fluid path are connected.

FIG. 1 illustrates a perspective view of an exterior of a battery pack 10 according to an embodiment. FIG. 2 illustrates a perspective view of the battery pack 10 of FIG. 1 from which a cover 300 has been separated therefrom. FIG. 3 illustrates a schematic view of the battery pack 10 of FIG. 1 in which a supply fluid path 410, the spray unit 400, and a recovery fluid path 420 are connected.

The battery pack 10 may be formed by stacking a plurality of battery modules 100 in vertical and/or horizontal directions. The battery modules 100 may each include one or more battery cells 110 stacked as a single unit. The battery cells 110 may generate heat when being charged or discharged, which may deteriorate performance or lifespan of the battery pack 10.

In particular, the plurality of battery cells 110 may be stacked in the battery pack 10 and heat may be generated in each battery cell 110. Accordingly, the battery pack 10 may spray an insulation fluid, e.g., pure water, onto the battery cells 110 inside the cover 300 so that heat generated in the battery cells 110 may be dissipated therefrom.

The battery pack 10 may be mounted in, e.g., an electric vehicle or a hybrid vehicle that performs an electric operation. The battery pack 10 may be mounted in a car in such a way that a quick drop method of separating the battery pack 10 from the car may be performed.

A spray unit 400 may directly spray the insulation fluid onto the battery cells 110 so that the heat generated in the battery cells 110 may be dissipated therefrom. The spray unit 400 may be disposed on an upper inner surface of the cover 300 in order to increase cooling efficiency of the insulation fluid.

The insulation fluid may be supplied to the spray unit 400 via a fluid tank 510 and a pump 520 that are disposed on a support 200. Here, since the cover 300 may be separated from the battery pack 10 in order to maintain, repair, and/or charge the battery pack 10, the spray unit 400 may be attached to and detached from, i.e., be detachably coupleable to, the fluid tank 510 and the pump 520.

Since the quick drop method may generally exchange the battery pack 10 as a whole, application of a circulation cooling method to the battery pack 10 may be limited. However, in the battery pack 10 of the present embodiment, the spray unit 400 may be supported by the cover 300 and may be detachably coupleable to the fluid tank 510 and the pump 520 disposed on the support 200. Thus, the quick drop type battery pack 10 may easily dissipate heat from the battery cells 110 while also facilitating easy exchange of the battery cells 110.

Characteristics of the insulation fluid may deteriorate or amount thereof may decline with use. However, according to the battery pack 10 of the present embodiment, the cover 300 may be separated from the battery pack 10 in a specific place, e.g., an electricity charging station, and the insulation fluid may be easily replaced or the fluid tank 510 may be refilled, thereby improving the cooling characteristics of the battery pack 10.

Referring to FIGS. 1-3, the battery pack 10 may include the battery modules 100, the support 200, the cover 300, and the spray unit 400.

Each battery module 100 may include at least one battery cell 110. The support 200 may support the battery modules 100 at one side of the battery pack 10. The cover 300 may be coupled to the support 200 and may accommodate the battery modules 100.

The spray unit 400 may be disposed above the battery modules 100 and may spray the insulation fluid onto the battery modules 100. The insulation fluid may include, e.g., pure water.

The battery pack 10 may spray a cooling fluid onto the battery cells 110 of the battery modules 100 via the spray unit 400 disposed over the battery modules 100 to cool the battery modules 100. The cooling fluid may be the insulation fluid, e.g., pure water. In this regard, the insulation fluid may be sprayed onto the battery cells 110 to prevent the battery cells 110 from being shorted due to the sprayed cooling fluid.

The insulation fluid may be sprayed in a liquid state. The insulation fluid sprayed in the liquid state may contact the battery cells 110 and may directly absorb heat from the battery cells 110. The insulation fluid sprayed in the liquid state may be changed into a gas by absorbing heat from the battery cells 110.

The insulation fluid may absorb heat generated by the battery cells 110. After liquid particles of the insulation fluid absorb an amount of heat corresponding to a heat of vaporization thereof, the insulation fluid may be changed into a gas, thereby efficiently dissipating heat generated by the battery cells 110. Accordingly, the insulation fluid may be sprayed in a relatively small particle form.

In an implementation, the spray unit 400 may receive the insulation fluid in the liquid state, change the insulation fluid from the liquid state to a gas state, and spray the insulation fluid in the gas state. In other words, the spray unit 400 may function as a humidifier. The insulation fluid in the liquid state may be changed into the gas state, thereby efficiently dissipating heat generated by the battery cells 110.

The support 200 may support the at least one battery module 100 at a lower side of the battery pack 10. That is, the battery modules 100 may be stacked on the support 200 in a vertical direction and/or in a horizontal direction. A thermal management system (TMS) may be installed in the support 200 to further dissipate heat generated by the battery modules 100.

In an implementation, the battery pack 10 of the present embodiment may dissipate heat generated by the battery modules 100 by using the spray unit 400 to spray the insulation fluid and may not include the TMS.

The cover 300 may be coupled to the support 200 and may accommodate the battery modules 100 therein. Thus, the cover 300 may protect the battery modules 100 from external elements. The spray unit 400 may be disposed between the cover 300 and the battery modules 100.

The spray unit 400 may be disposed between the inner surface of the cover 300 and upper surfaces of the battery modules 100. However, the embodiments are not limited thereto; and the spray unit 400 may be disposed between the inner surface of the cover 300 and side surfaces of the battery modules 100.

Figure 4:
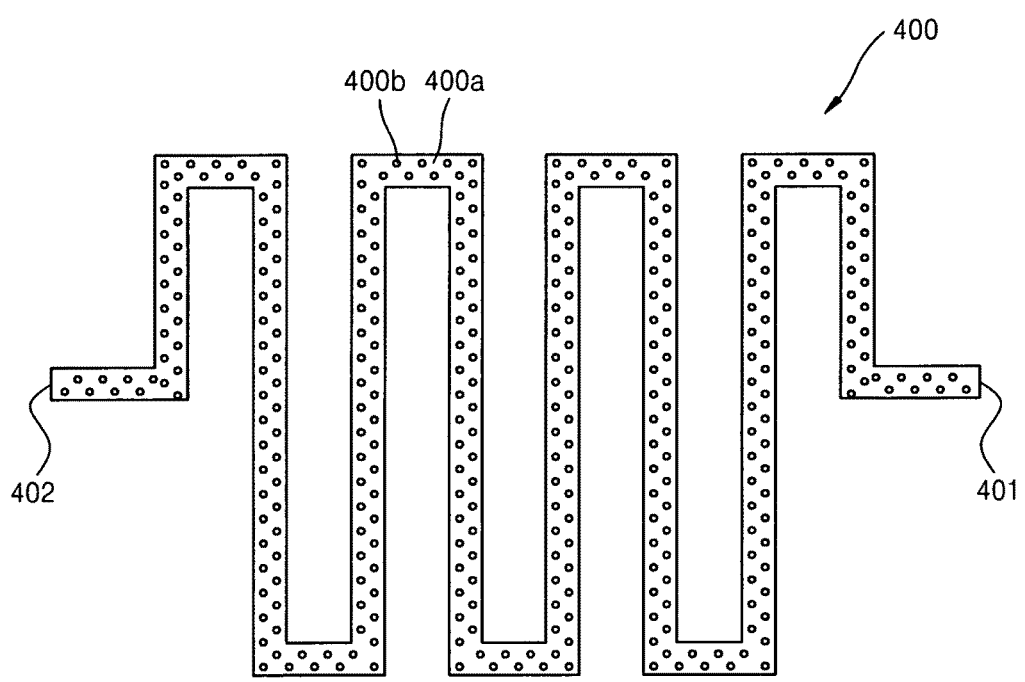
FIG. 4 illustrates a top view of the spray unit of FIG. 3.

FIG. 4 illustrates a top view of the spray unit 400 of FIG. 3.

Referring to FIGS. 3 and 4, the spray unit 400 may include a spray pipe 400*a* and spray holes 400*b*. The insulation fluid may pass through the spray pipe 400*a*. The insulation fluid may be sprayed through the spray holes 400*b* in the spray pipe 400*a*.

The spray pipe 400*a* may be disposed on the inner surface of the cover 300. The spray pipe 400*a* may contact the inner surface of the cover 300 such that the spray pipe 400*a* may be effectively supported by the inner surface of the cover 300.

In an implementation, the spray pipe 400*a* may be spaced apart by a predetermined distance from the inner surface of the cover 300. The spray holes 400*b* may be disposed over the upper surfaces or under lower surfaces of the battery modules 100 so that the insulation fluid may be sprayed over a wide area. The spray pipe 400*a* may be curved in order to secure a sufficient spray area, as illustrated in FIG. 4.

The spray pipe 400*a* may be disposed between the cover 300 and an upper surface of a battery region 100*a* in which the battery modules 100 are disposed inside the cover 300. The spray unit 400 may include an inlet 401 and an outlet 402. The insulation fluid may be supplied into the spray pipe 400*a* through the inlet 401 and may be recovered from the spray pipe 400*a* through the outlet 402.

The battery pack 10 may further include the supply fluid path 410 and the recovery fluid path 420. The supply fluid path 410 may connect the pump 520 and the inlet 401 of the spray unit 400. The recovery fluid path 420 may connect the outlet 402 of the spray unit 400 and the fluid tank 510. In an implementation, positions of the supply fluid path 410 and the recovery fluid path 420 may be switched.

The supply fluid path 410 and the recovery fluid path 420 may be supported inside the cover 300. The supply fluid path 410 and the recovery fluid path 420 may be supported by and fixed to the inner surface of the cover 300 in order to support the supply fluid path 410 and the recovery fluid path 420.

The supply fluid path 410 and the recovery fluid path 420 may be respectively detachably coupleable to the pump 520 and the fluid tank 510. An outlet of the pump 520 may be detachably coupleable to an end of the supply fluid path 410 opposite to an end of the supply fluid path 410 to which the spray unit 400 is connected. An inlet of the fluid tank 510 may be detachably coupleable to an end of the recovery fluid path 420 opposite to an end of the recovery fluid path to which the spray unit 400 is connected.

Another spray unit (not illustrated) may be included in the supply fluid path 410 and/or the recovery fluid path 420. The spray unit included in the supply fluid path 410 and/or the recovery fluid path 420 may spray the insulation fluid onto the battery modules 100 from the inner side of the cover 300 to the side surfaces of the battery modules 100 to improve the cooling performance of the battery cells 110.

The insulation fluid may be accommodated in the fluid tank 510 and may be supplied to the spray unit 400 through the pump 520. The fluid tank 510 and the pump 520 may be connected via a connection pipe 530. The insulation fluid in the fluid tank 510 may be supplied to the pump 520 through the connection pipe 530 and may be supplied to the spray unit 400 through the pump 520.

The fluid tank 510 may be detachably coupleable to one end of the recovery fluid path 420 and thus may be separated from the spray unit 400 when the cover 300 is separated from the battery pack 10. The pump 520 may be detachably coupleable to one end of the supply fluid path 410 and thus may also be separated from the spray unit 400 when the cover 300 is separated from the battery pack 10.

The pump 520 may supply the insulation fluid in the fluid tank 510 to the spray pipe 400*a* through the supply fluid path 410. The insulation fluid may be sprayed in the liquid or gas state through the spray holes 400*b* in the spray pipe 400*a*.

Insulation fluid that remains in the spray pipe 400*a* may be recovered in the fluid tank 510 through the recovery fluid path 420. A recovery unit (not illustrated) may be disposed in a support to recover and recycle the sprayed insulation fluid.

The insulation fluid may be circulated in the fluid tank 510, the spray unit 400, and the cover 300, so that the temperature inside the battery pack 10 may be suitable for operations of the battery cells 110. The insulation fluid may be repeatedly circulated in the battery pack 10.

The insulation fluid in the fluid tank 510 may have a constant temperature at a specific place, e.g., an electricity charging station. The insulation fluid may be replaced and/or the fluid tank 510 may be refilled at the charging station. To this end, the cover 300 may be separated from the support 200 so that the insulation fluid may be easily exchanged or the fluid tank 510 may be refilled, thereby improving cooling characteristics of the battery pack 10. After the quick drop type battery pack 10 is separated from a vehicle, the insulation fluid in the fluid tank 510 may be exchanged and/or the fluid tank 510 may be refilled from outside the car.

The fluid tank 510 and the pump 520 may be accommodated in the support 200 as illustrated in FIG. 3; and the cover 300 may be detached from the support 200. Accordingly, the fluid tank 510 and the pump 520 may be fixed to the support 200 and may be separated from the spray unit 400 when the cover 300 is separated from the support 200.

Figure 5:
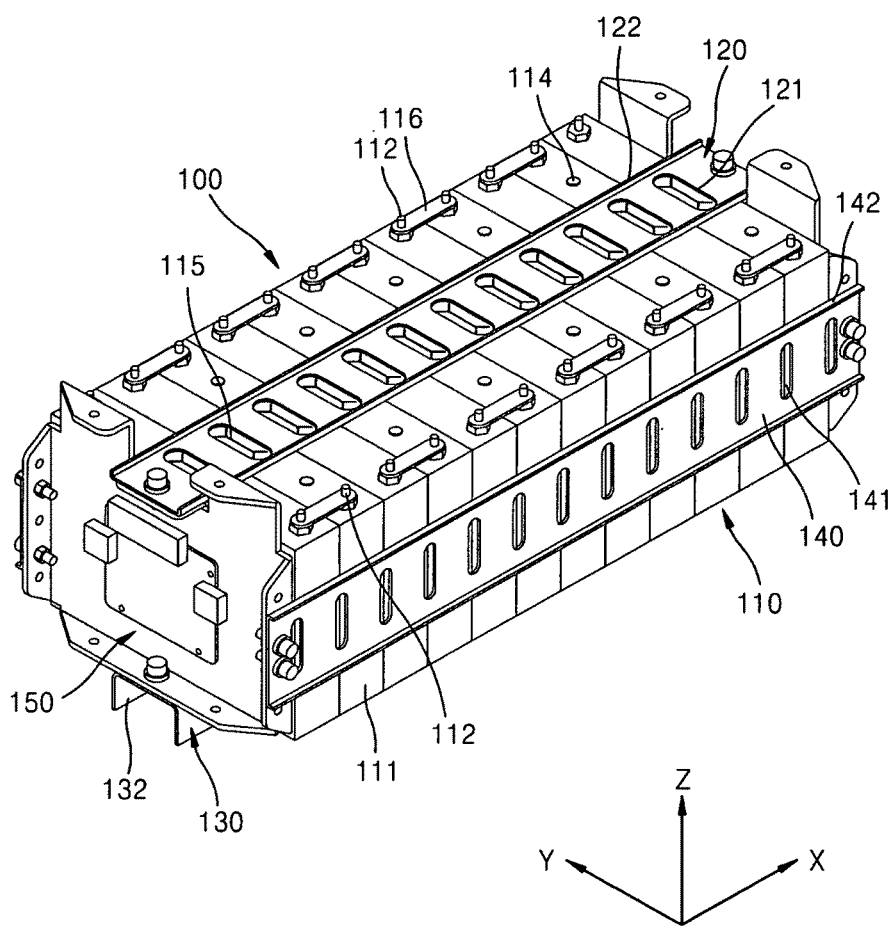
FIG. 5 illustrates a perspective view of a battery module of the battery pack of FIG. 1 in which a plurality of battery cells are stacked.

FIG. 5 illustrates a perspective view of a battery module 100 of the battery pack 10 of FIG. 1 according to an embodiment.

The battery cells 110 of the battery module 100 may be stacked in a first direction, e.g., in an X direction. The battery modules 100 of the battery pack 10 may also be stacked in a second direction, e.g., in a Z direction, and/or in a third direction, e.g., in a Y direction.

Referring to FIG. 5, the battery module 100 may include at least one battery cell. In an implementation, a plurality of battery cells 110 may be stacked on one another. The battery module 100 may include the battery cells 110, an upper frame 120, a lower frame 130, a side frame 140, and a pair of end plates 150.

The battery cells 110 may be stacked in the first direction. The upper frame 120 may support the stacked battery cells 110 from one side, e.g., from an upper portion thereof. The lower frame 130 may support the battery cells 110 from another side, e.g., from a lower portion thereof. The side frame 140 may support the stacked battery cells 110 from side surfaces thereof. The end plates 150 may support the stacked battery cells 110 at opposite ends thereof.

The battery cells 110 may be stacked in the first direction to form the battery module 100. The upper frame 120 may be disposed above the battery cells 110 stacked in the first direction to support the stacked battery cells 110 in the second direction. The lower frame 130 may be disposed below the battery cells 110 that are stacked in the first direction to support the stacked battery cells 110 from a lower portion thereof.

The side frame 140 may be disposed on side surfaces of the battery cells 110 stacked in the first direction to support the stacked battery cells 110 from the side surfaces thereof. The pair of end plates 150 may be disposed at both ends of the battery cells 110 stacked in the first direction to support the stacked battery cells 110.

The first direction may be the X direction. The second direction may be the Z direction. When the battery pack 10 is disposed horizontally, the X direction may be a horizontal direction and the Z direction may be a vertical direction. However, the embodiments are not limited thereto; and the first and second directions may be determined according to an orientation of the battery pack 10.

The battery cells 110 may be stacked in a horizontal direction so as to form the battery module 100. As illustrated in FIG. 5, quadrilateral battery cells may be used as the battery cells 110. However, the embodiments are not limited thereto; and various battery cells, e.g., circular battery cells or pouch type battery cells, may also be used.

The battery cells 100 may each include an electrode assembly accommodated in a case 111. A plurality of electrode terminals 112 may be exposed outside the case 111. An electricity collector that is electrically connected to a positive electrode plate and a negative electrode plate of the electrode assembly may be electrically connected to the electrode terminals 112. The case 111 may be cylindrical or quadrilateral. The battery cells 110 may each include a plurality of the electrode assemblies inside the case 111.

Rechargeable batteries that are stacked adjacent to each other may be electrically connected to the electrode terminals 112. The electrode terminals 112 of the battery cells 110 may be electrically connected via a plurality of bus bars 116.

The battery cells 110 that are adjacent to each other may be arranged in such a way that positive electrodes and negative electrodes of the battery cells 110 are arranged opposite to cross each other. The battery cells 110 may be connected in parallel, in series, or in a combination thereof. Thus, the battery cells 110 may be connected, thereby forming the battery module 100. The connection configuration and number of the stacked battery cells 110 may be determined in consideration of desired charging and discharging capacities when designing the battery cells 110.

A cap plate may be coupled to an opening portion of the case 111. The cap plate may be a thin plate. An electrolyte solution inlet through which an electrolyte solution is injected may be formed in the cap plate. The electrolyte solution inlet may be sealed using a sealing stopper 114 after the electrolyte solution is injected.

Also, a vent member 115, in which a groove is formed, may be formed in the cap plate so that the cap plate may burst at a predetermined internal pressure. When the upper frame 120 is disposed on the horizontally stacked battery cells 110, a discharge opening 121 of the upper frame 120 may be disposed above the vent member 115.

The battery cells 110 according to the present embodiment may be, e.g., lithium-ion batteries. However, the embodiments are not limited thereto; and the battery cells 110 may instead be various types of batteries, e.g., a nickel-cadmium rechargeable battery, a nickel-hydrogen rechargeable battery, and/or a lithium battery.

Due to charging and discharging of the battery cells 110 including lithium, the electrode assemblies thereof may expand and contract. When the electrode assemblies expand or contract, a physical force may be applied to the cases 111. Thus, the cases 111 may physically expand or contract in accordance with a variation of the electrode assemblies.

Deformation of the case 111 may occur due to repeated expansion and contraction. An expansion of volume of the case 111 may increase resistance and decrease efficiency of the battery cells 110. In order to prevent a decrease in the efficiency due to the expansion of volume of the case 111, the end plates 150 may support the battery cells 110 at both ends of the stacked battery cells 110. Thus, a predetermined pressure may be applied to the stacked battery cells 110.

Also, heat may be generated by a charging or discharging operation of the battery cells 110, which may deteriorate the battery performance or lifespan. Thus, the battery pack 10 according to the present embodiment may absorb heat generated in the battery cells 110 via the insulation fluid sprayed by the spray unit 400.

The pair of end plates 150 may be arranged in a horizontal direction and/or in a vertical direction and at both ends of the battery cells 110 electrically connected to each other. Also, the upper frame 120, the lower frame 130, and the side frame 140 may be supported at upper and lower surfaces and side surfaces of the end plates 150, respectively, and may be compressively fixed to the end plates 150 so that the battery cells 110 do not extend in a horizontal direction due to expansion and contraction of the battery cells 110.

The ends plates 150 may be disposed at both ends of the battery module 100. One surface of each of the end plates 150 may be closely coupled to exterior surfaces of the battery cells 110 that are disposed at outermost ends of the battery module 100 and may support the stacked battery cells 110.

The plurality of battery modules 100 may be stacked in a vertical direction and/or in a horizontal direction to form the battery pack 10. The battery modules 100 that are stacked adjacent to each other may be supported by coupling respective end plates 150 thereof to each another.

The upper frame 120 may be disposed on the battery cells 110 stacked in a horizontal direction and may be coupled to the upper surface of the end plates 150. The discharging opening 121 may be disposed in the upper frame 120 at a position corresponding to the vent member 115 of the battery cells 110.

The upper frame 120 may have an upper frame bent portion 122 that is bent at sides thereof in a lengthwise direction. A sealing member may be mounted in the upper frame bent portion 122. The sealing member may be formed of an elastic member, e.g., rubber. The upper frame 120 may be coupled to the lower frame 130 of one battery module 100 stacked on the upper frame 120; and the upper frame 120 and the lower frame 130 may form a sealed gas discharge path.

In order to prevent gas generated through the vent member 115 from affecting the rechargeable battery cells 110 and to allow the gas to be discharged via the discharging opening 121 of the upper frame 120, a sealing ring 117 may be included between the upper frame 120 and the vent member 115. The sealing ring 117 may include, e.g., an O-ring.

The sealing ring 117 disposed between the battery cells 110 and the upper frame 120 may have a sufficient thickness. Thus, when the upper frame 120 is coupled to the end plates 150, the upper frame 120 may apply a pressure to the upper portion of the battery cells 110 and may compress the sealing ring 117 interposed therebetween so that the upper frame 120 and the end plates 150 may be closely coupled to each other.

The lower frame 130 may be disposed at a lower portion of the battery cells 110 to support a load of the battery cells 110. The lower frame 130 may be connected to the lower surfaces of the end plates 150. In order to bear the load of the battery cells 110, the lower frame 130 may include a lower frame bent portion 132 that is bent in a direction opposite to a surface that supports the battery cells 110.

The lower frame bent portions 132 may have a structure that is opened toward the lower portion thereof. Also, the lower frame bent portion 132 may be coupled to the upper frame 120 of a battery module 100 that is stacked therebelow to form a gas path. The gas path that is formed by coupling the lower frame 130 and the upper frame 120 that are stacked above and below may function as a duct for discharging gas when gas is generated.

The side frame 140 may be disposed on the side surfaces of the battery cells 110 that are stacked to support the battery cells 110 from the side surfaces thereof. The side frame 140 may extend a predetermined width beyond one end of the end plates 150 and may extend a predetermined width beyond another end of the end plates 150.

At least one through hole 141 may be disposed in the side frame 140 to reduce the weight of the side frame 140. Also, the side frame 140 may include a side surface frame bent portion 142 that is bent in a direction opposite to a surface that supports the battery cells 110. The bending rigidity of the side frame 140 may be supplemented by the side frame bent portion 142.

Figure 6:
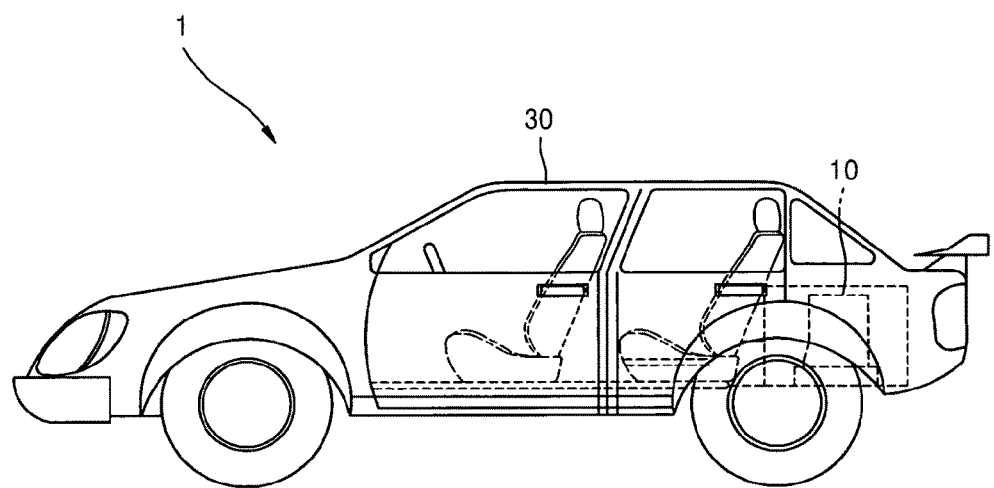
FIG. 6 illustrates a schematic view of an electric car in which the battery pack of FIG. 1 is accommodated.

FIG. 6 illustrates a schematic view of an electric car 1 in which the battery pack of FIG. 1 is accommodated.

Referring to FIGS. 1-6, the battery pack 10 may be formed by arranging the battery cells 110 in a horizontal direction, forming the battery module 100, stacking a plurality of the battery modules 100 in two rows and four stories, and combining eight (2×4) battery modules 100.

Each of the battery modules 100 may include a duct (not illustrated) for discharging gas by matching the lower frame 130 and the upper frame 120 of the battery module 100 disposed below the lower frame 130.

The battery pack 10 may be loaded in a designated space of a car body 30 of the electric car 1. In the battery pack 10 including the battery cells 110, gas may be generated due to, e.g., an explosion or the like. In this case, a dangerous amount of toxic gas may be generated in a short time. When the toxic gas flows into a car including people, the toxic gas may be harmful for the people.

The battery pack 10 may be accommodated in a sealing case (not illustrated) and sealed therein. The sealing case may be connected to the outside via an external duct (not illustrated). Thus, gases, e.g., exhaust and/or toxic gases, may be discharged out of the electric car 1 by connecting the external duct to the battery pack 10.

The battery pack 10 may be mounted in the car body 30 using a quick drop method of separating the battery pack 10 from the electric car 1. The battery pack 10 may spray an insulation fluid onto the battery module 100 and dissipate heat generated by the battery module 100.

According to the embodiments, the cooling characteristics of a battery pack may be improved by cooling the battery pack by using a liquid having insulation characteristics.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
a battery module including at least one battery cell; and
a spray unit above the battery module for spraying an insulation fluid onto the battery module, the spray unit including:
a spray pipe through which the insulation fluid passes, the spray pipe being curved and being disposed on an inner surface of a cover of the battery pack, and
a spray hole in the spray pipe, the spray hole being configured to spray the insulation fluid.

2. The battery pack as claimed in claim 1, wherein the insulation fluid is pure water.

3. The battery pack as claimed in claim 1, wherein the insulation fluid is sprayed in a liquid state or in a gas state.

4. The battery pack as claimed in claim 1, wherein:
the cover is for accommodating the battery module therein, and
the spray unit is disposed between the cover and the battery module.

5. The battery pack as claimed in claim 4, wherein the spray unit contacts an upper inner surface of the cover.

6. The battery pack as claimed in claim 1, further comprising:
a fluid tank configured to accommodate the insulation fluid; and
a pump configured to supply the insulation fluid from the fluid tank to the spray unit.

7. The battery pack as claimed in claim 6, further comprising a support configured to support the battery module on one surface thereof, wherein the fluid tank and the pump are accommodated in the support.

8. The battery pack as claimed in claim 6, further comprising:
a supply fluid path connecting the pump and an inlet of the spray unit; and
a recovery fluid path connecting an outlet of the spray unit and the fluid tank.

9. The battery pack as claimed in claim 8, wherein the supply fluid path and the recovery fluid path are supported by an inner surface of the cover.

10. The battery pack as claimed in claim 8, wherein:
the supply fluid path and the pump are detachably coupleable to each other, and
the recovery fluid path and the fluid tank are detachably coupleable to each other.

11. A battery pack that effects heat dissipation by way of an insulating fluid, the battery pack comprising:
a battery module including at least one battery cell; and
a spray unit above the battery module for spraying insulation fluid onto the battery module, the spray unit including:
a spray pipe through which the insulation fluid passes, the spray pipe being curved and being disposed on an inner surface of a cover of the battery pack, and
a spray hole in the spray pipe, the spray hole being configured to spray the insulation fluid.

12. The battery pack that effects heat dissipation by way of an insulating fluid as claimed in claim 11, wherein:
the cover is for accommodating the battery module therein, and
the spray unit is disposed between the cover and the battery module.

13. The battery pack that effects heat dissipation by way of an insulating fluid as claimed in claim 11, further comprising:
a fluid tank configured to accommodate the insulation fluid; and
a pump configured to supply the insulation fluid from the fluid tank to the spray unit.

14. The battery pack that effects heat dissipation by way of an insulating fluid as claimed in claim 13, further comprising a support configured to support the battery module on one surface thereof, wherein the fluid tank and the pump are accommodated in the support.

15. The battery pack that effects heat dissipation by way of an insulating fluid as claimed in claim 13, further comprising:
   a supply fluid path connecting the pump and an inlet of the spray unit; and
   a recovery fluid path connecting an outlet of the spray unit and the fluid tank.

16. The battery pack that effects heat dissipation by way of an insulating fluid as claimed in claim 15, wherein:
   the supply fluid path and the pump are detachably coupleable to each other, and
   the recovery fluid path and the fluid tank are detachably coupleable to each other.

* * * * *